United States Patent
Eswarakrishnan et al.

(10) Patent No.: US 7,459,504 B2
(45) Date of Patent: Dec. 2, 2008

(54) REACTION PRODUCT OF POLYAMINE AND ACYCLIC CARBONATE

(75) Inventors: Venkatachalam Eswarakrishnan, Allison Park, PA (US); Gregory J. McCollum, Gibsonia, PA (US); Matthew Scott, Pittsburgh, PA (US); Geoffrey R. Webster, Jr., Gibsonia, PA (US); Judith A. Orzechowski, Oakmont, PA (US); Kevin J. Dufford, Karns City, PA (US); David Robert Fenn, Allison Park, PA (US); Alan J. Kaylo, Glenshaw, PA (US); Thomas C. Moriarity, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 467 days.

(21) Appl. No.: 11/101,803

(22) Filed: Apr. 8, 2005

(65) Prior Publication Data

US 2006/0229419 A1    Oct. 12, 2006

(51) Int. Cl.
B32B 15/08     (2006.01)
C08G 59/40     (2006.01)
C08L 33/14     (2006.01)
C08L 63/02     (2006.01)
C08L 63/10     (2006.01)

(52) U.S. Cl. ............ 525/531; 428/418; 525/327.3; 525/330.5; 525/403; 525/407; 525/438; 525/439; 525/453; 525/454; 525/510; 525/511; 525/523; 528/119; 528/123

(58) Field of Classification Search .............. None
See application file for complete search history.

(56) References Cited

U.S. PATENT DOCUMENTS

| 4,335,028 | A |   | 6/1982  | Ting et al. ............... 524/504 |
|-----------|---|---|---------|-------------------------------------|
| 4,484,994 | A |   | 11/1984 | Jacobs, III et al. ........ 204/181 |
| 4,543,376 | A |   | 9/1985  | Schupp et al. ............ 523/414 |
| 4,554,212 | A |   | 11/1985 | Diefenbach et al. ....... 428/413 |
| 4,931,157 | A |   | 6/1990  | Valko et al. ............. 204/181.7 |
| 5,272,188 | A |   | 12/1993 | Kriessmann et al. ....... 523/412 |
| 5,338,419 | A |   | 8/1994  | Wehner et al. ........... 204/181.4 |
| 5,347,034 | A | * | 9/1994  | Hammen et al. ............ 560/25 |
| 5,478,870 | A |   | 12/1995 | Kudoh et al. ............. 523/409 |
| 5,902,473 | A |   | 5/1999  | Harris et al. ............ 205/229 |
| 2007/0083030 | A1 | * | 4/2007 | Bruchmann et al. ........ 528/196 |

FOREIGN PATENT DOCUMENTS

| DE | 3246812     | 6/1982 |
|----|-------------|--------|
| EP | 0 149 156 A2 | 12/1984 |
| EP | 0 149 156   | 7/1985 |
| EP | 0 889 101 A2 | 6/1998 |
| EP | 1 156 085 A1 | 5/2001 |
| WO | WO 88/10250 | 12/1988 |

* cited by examiner

*Primary Examiner*—Robert Sellers
(74) *Attorney, Agent, or Firm*—Robert A. Diaz

(57) ABSTRACT

The present invention provides a film-forming composition. The composition includes a reaction product of:
a) a polyamine containing a primary amino group and a secondary amino group; and
b) an acyclic carbonate.

Also provided is a method of preparing a film-forming composition and an article coated with such compositions.

19 Claims, No Drawings

REACTION PRODUCT OF POLYAMINE AND ACYCLIC CARBONATE

FIELD OF THE INVENTION

The present invention is directed to film-forming compositions. More particularly, the present invention is directed to curable, electrodepositable film-forming compositions containing reaction products of acyclic carbonates and polyamines.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Electrodepositable primer coating compositions, particularly those used in the automotive industry, typically are corrosion-resistant epoxy-based compositions crosslinked with polyisocyanates. In some applications, a primer-surfacer is spray-applied directly to the cured electrodeposited coating prior to application of one or more top coats. The primer-surfacer can provide a variety of properties to the coating system, including protection of the electrodeposited coating from photodegradation. Alternatively, one or more top coats can be applied directly to the cured electrodeposited coating and in such instances, the top coat(s) are formulated such that the top coat provides sufficient protection to prevent photodegradation of the electrodeposited primer coating.

Various approaches to lowering the photosensitivity of electrodepositable coatings include, inter alia, the use of blocked aliphatic polyisocyanate cross-linking agents. However, excessive cost makes the use of such crosslinking agents undesirable. Accordingly, there remains a need in the coatings industry for a cost effective alternative to conventional aliphatic polyisocyanates, which retards photodegradation of electrodepositable coatings.

SUMMARY OF THE INVENTION

In one embodiment, the present invention is directed to a film-forming composition comprising a reaction product of:
  a) a polyamine containing a primary amino group and a secondary amino group; and
  b) an acyclic carbonate.

In another embodiment, the present invention provides a film-forming composition comprising a reaction product of:
  a) a polyamine containing a primary amino group and a secondary amino group;
  b) an acyclic carbonate; and
  c) a polyepoxide polymer.

In a further embodiment, the present invention is directed to a method of preparing a film-forming composition comprising:
  1) combining the following components to form a reaction mixture:
    a) a polyamine containing a primary amino group and a secondary amino group; and
    b) an acyclic carbonate; and
  2) allowing the components to react to form a first reaction product.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Plural encompasses singular and vice versa, for example, "a" or "an" can include "one" primary amino group or "more than one" primary amino group.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

The compositions of the present invention may be curable compositions. As used herein, the terms "curable" and "substantially cured" as used in connection with a curable composition means that any crosslinkable components of the composition are at least partially crosslinked after a curing process (e.g., heating). In certain embodiments of the present invention, the crosslink density (degree of crosslinking) of the crosslinkable components ranges from 5% to 100% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

Also, as used herein, the term "polymer" is meant to refer to prepolymers, oligomers and both homopolymers and copolymers. The prefix "poly" refers to two or more. Unless stated otherwise, as used in the specification and the claims, molecular weights are number average molecular weights for polymeric materials indicated as "$M_n$," and obtained by gel permeation chromatography using polystyrene standards in an art-recognized manner.

As mentioned above, in one embodiment, the present invention is directed to a film-forming composition, typically a curable film-forming composition, comprising a reaction product of:
  a) a polyamine containing a primary amino group and a secondary amino group; and
  b) an acyclic carbonate.

Polyamines suitable for use in the preparation of the reaction product used in the film-forming composition of the present invention contain a primary amino group and a secondary amino group. Any polyamines having these characteristics known to those skilled in the art may be used. In one embodiments, the polyamines contain at least two primary amino groups. Suitable polyamines include, for example, diethylenetriamine, dipropylenetriamine, and/or bis-hexamethylenetriamine. In an embodiment of the present invention, the polyamines used to prepare the reaction product comprising the film-forming compositions of the present invention are not intended to include polyfunctional amines containing at least one primary or secondary amino group and another functional group containing an active hydrogen such as a hydroxyl group.

The carbonate used to prepare the reaction product present in the curable film-forming composition of the present invention comprises an acyclic carbonate. Non-limiting examples of suitable acyclic carbonates include dimethyl carbonate, diethyl carbonate, methylethyl carbonate, dipropyl carbonate, methylpropyl carbonate, and/or dibutyl carbonate. In an embodiment of the present invention, the acyclic carbonate comprises dimethyl carbonate.

In certain non-limiting embodiments of the present invention, the reaction products described above may be prepared by:
1) combining the following components to form a reaction mixture:
   a) a polyamine containing a primary amino group and a secondary amino group; and
   b) an acyclic carbonate; and
2) allowing the components to react to form a reaction product.

In such a preparation method, the components may be allowed to react over a period of at least one hour. Additionally, the reaction may be conducted within a temperature range of ambient (i.e., 22° C. to 28° C. at atmospheric pressure) to 100° C. In one embodiment the reaction is run at ambient temperature. The reaction mixture of the present invention may be essentially free of catalysts, particularly when the acyclic carbonate comprises dimethyl carbonate.

After the reaction has been allowed to proceed, for example, when the reaction has reached at least 50% completion, often at least 75% completion, as determined by titration for unreacted base, the preparation method may further comprise a step 3) of combining the reaction product formed in step 2) with a compound having functional groups that are reactive with primary amines to form a second reaction product. The compound having functional groups that are reactive with primary amines may comprise, for example, cyclic carbonates such as ethylene carbonate, propylene carbonate, and/or butylene carbonate. Other functional groups that are reactive with primary amines include mono- and polyisocyanates, acids, anhydrides, ketones, and aldehydes. These and other compounds known to be reactive with primary amines may also be used.

In separate, non-limiting embodiments of the present invention, the film-forming composition comprises a reaction product of:
1) a first reactant comprising a reaction product of:
   a) a polyamine containing a primary amino group and a secondary amino group; and
   b) an acyclic carbonate; and
2) a second reactant comprising a polyepoxide polymer.

The first reactant may be prepared separately from and prior to addition of the second reactant to form the reaction product of the present invention.

In these embodiments, the polyamine and acyclic carbonate may be any of those as described above. The polyepoxide polymer may comprise any film-forming polyepoxide polymer known to those skilled in the art. It is typically selected from epoxy functional acrylic polymers, polyglycidyl ethers of polyphenols or polyhydric alcohols, which may be chain-extended, and mixtures thereof.

Suitable polyepoxide polymers for use in the preparation of the reaction product may include a polyepoxide prepared by etherification of a polyphenol or polyhydric alcohol with an epihalohydrin or dihalohydrin such as epichlorohydrin or dichlorohydrin in the presence of alkali. A chain extended polyepoxide is typically prepared by reacting together the polyepoxide and polyphenol or polyhydric alcohol using techniques known in the art.

The equivalent ratio of reactants; i.e., epoxy:polyhydroxyl group-containing material typically is from 1.00:0.75 to 1.00:2.00.

The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually two; that is, polyepoxides which have on average two epoxide groups per molecule Epoxy functional acrylic polymers may comprise acrylic polymers derived from ethylenically unsaturated epoxy functional monomers such as epoxy functional esters of acrylic and/or methacrylic acid, copolymerized with other acrylic monomers. Epoxy functional acrylic polymers may alternatively comprise graft copolymers of acrylic polymers and polyepoxides.

Epoxy-acrylic graft copolymers can be prepared by first preparing a polyepoxide polymer as described above and then preparing an acrylic polymer by polymerizing ethylenically unsaturated monomers in the presence of the polyepoxide polymer under conditions that produce some molecules containing both polyepoxide and polyacrylic fractions. Optionally the ethylenically unsaturated monomers can include an ethylenically unsaturated epoxy functional monomer such as glycidyl acrylate, glycidyl methacrylate, allyl glycidyl ether and/or methallyl glycidyl ether. In an embodiment of the invention, the ethylenically unsaturated monomers can include 5 to 25 percent, based on the total weight of ethylenically unsaturated monomers, of ethylenically unsaturated epoxy functional monomer One method of producing a graft polymer is to utilize an initiator for the acrylic polymerization that produces highly energetic free radicals capable of generating grafting sites on the polyepoxide polymer. Suitable initiators include, for example, hydrogen peroxide, benzoyl peroxide and t-butyl perbenzoate.

A further method is to incorporate polymerizable groups into the polyepoxide polymer. For example, some of the epoxy groups from the polyepoxide polymer can be reacted with acrylic acid or methacrylic acid. Alternatively, some of the hydroxyl groups from the polyepoxide polymer can be reacted with m-TMI (available from Cytec Industries) or 2-isocyanatoethyl methacrylate. Ethylenically unsaturated groups can also be incorporated into the polyepoxide polymer by preparing the polyepoxide polymer in the presence of a phosphonium catalyst, for example ethyltriphenylphosphonium iodide. The preformed polyepoxide polymer also can be reacted with ethyltriphenylphosphonium iodide. The level of phosphonium catalyst typically ranges from 0.05 to 1% based on the weight of polyepoxide polymer, such as 0.07 to 0.7%, or 0.2%.

An epoxy-acrylic graft copolymer also can be produced by using one or more ethylenically unsaturated monomers containing functional groups that are capable of reacting with functional groups on the polyepoxide polymer. For example acrylic acid or methacrylic acid can react with the epoxy groups in the polyepoxide polymer and m-TMI or 2-isocyanatoethyl methacrylate can react with hydroxyl groups in the polyepoxide polymer. The level of ethylenically unsaturated monomers containing functional groups that are capable of reacting with functional groups on the polyepoxide polymer can range from 0.1 to 5% based on the total weight of ethylenically unsaturated monomers, such as 1 to 2%.

Other useful alkyl esters of acrylic acid or methacrylic acid that may be used to prepare the epoxy-acrylic graft copolymer include aliphatic alkyl esters containing from 1 to 30, such as 4 to 18 carbon atoms in the alkyl group. Non-limiting examples include methyl methacrylate, ethyl methacrylate, butyl methacrylate, ethyl acrylate, butyl acrylate, 2-ethyl hexyl acrylate, hydroxypropyl (meth)acrylate, glycidyl (meth)acrylate, and hydroxyethyl (meth)acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Generally any method of producing such acrylic polymers that is known to those skilled in the art utilizing art recognized amounts of monomers can be used to prepare the epoxy functional acrylic polymer.

In certain non-limiting embodiments of the present invention, any of the film-forming compositions disclosed above may further comprise a film-forming polymer, including crosslinking film-forming polymers. Any film-forming polymers known to those skilled in the art can be used, such as acrylics, polyesters, polyurethanes, and/or polyepoxides. Monoepoxides are also suitable. The polymer may contain ionic groups (cationic or anionic as discussed below) in particular embodiments; for example, when the film-forming composition is electrodepositable. The polymer may contain functional groups in particular embodiments. Such functional groups can include, for example, epoxy groups, vinyl groups, blocked isocyanate groups, ester groups, active hydrogen-containing groups such as thiol, hydroxyl, acid, carbamate, amine, and/or phenolic hydroxyl groups. Most often, the functional groups comprise those that react with isocyanate groups, for example hydroxyl and/or amino groups. In addition, both ionic groups and functional groups may be present on the film-forming polymer.

The polymer used in the composition of the present invention may be a water-dispersible, film-forming polymer. The water-dispersible polymer may be ionic in nature; that is, the polymer can contain anionic functional groups to impart a negative charge or cationic functional groups to impart a positive charge. In an embodiment of the present invention, the polymer contains cationic groups, such as cationic amine salt groups, quaternary ammonium groups, ternary sulfonium groups and/or quaternary phosphonium groups.

Non-limiting examples of film-forming resins suitable for use in anionic coating compositions, include base-solubilized, carboxylic acid group-containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable resin comprises an alkyd-aminoplast vehicle, i.e., a vehicle containing an alkyd resin and an amine-aldehyde resin. Another suitable anionic resin composition comprises mixed esters of a resinous polyol. Other acid functional polymers also can be used such as phosphatized polyepoxide or phosphatized acrylic polymers as are well known to those skilled in the art. Additionally, suitable for use as the polymer are those resins comprising one or more pendent carbamate functional groups, for example, those described in U.S. Pat. No. 6,165,338.

When the film-forming polymer comprises a polyepoxide, such polyepoxides may be any of those disclosed above used to prepare the reaction product.

Suitable acrylic polymers for use as the film-forming polymer can include copolymers of one or more alkyl esters of acrylic acid or methacrylic acid, optionally together with one or more other polymerizable ethylenically unsaturated monomers. Suitable alkyl esters of acrylic acid or methacrylic acid include methyl (meth)acrylate, ethyl (meth)acrylate, butyl (meth)acrylate, and 2-ethyl hexyl (meth)acrylate. Suitable other copolymerizable ethylenically unsaturated monomers include nitriles such acrylonitrile and methacrylonitrile, vinyl and vinylidene halides such as vinyl chloride and vinylidene fluoride and vinyl esters such as vinyl acetate. Acid and anhydride functional ethylenically unsaturated monomers such as acrylic acid, methacrylic acid or anhydride, itaconic acid, maleic acid or anhydride, or fumaric acid may be used. Amide functional monomers including, acrylamide, methacrylamide, and N-alkyl substituted (meth)acrylamides are also suitable. Vinyl aromatic compounds such as styrene and vinyl toluene can be used so long as photodegradation resistance of the polymer and the resulting electrodeposited coating is not compromised.

Functional groups such as epoxy, hydroxyl and/or amino groups can be incorporated into the acrylic polymer.

Also suitable are art recognized polyester, polyether and/or polyurethane polymers having any of the reactive functional groups mentioned above, and/or any of the previously described ionic groups. In particular embodiments of the present invention, the polymer comprises a cationic, active hydrogen-containing electrodepositable resin capable of deposition on a cathode. In addition to those mentioned above, non-limiting examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Also, compositions as described in U.S. Pat. No. 4,134,866 and DE-OS No. 2,707,405 can be used in the composition of the present invention as the polymer.

Besides amine salt group-containing resins, quaternary ammonium salt group-containing resins also can be employed as mentioned above. Examples of these resins include those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Further, cationic compositions prepared from Mannich bases such as described in U.S. Pat. No. 4,134,932 can be used.

In one embodiment of the present invention, the polymer can comprise one or more positively charged resins which contain primary and/or secondary and/or tertiary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when a polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

In particular embodiments, cationic amine salt groups present on the film-forming polymer may be derived from a compound comprising ammonia, methylamine, methylethanolamine, dibutylamine, aminopropyldiethanolamine, dimethylaminopropylamine, diethanolamine, diisopropanolamine, N-hydroxyethyl ethylenediamine, and/or diethylenetriamine. In such an embodiment, one or more of these compounds is reacted with one or more of the above described polymers, for example, a polyepoxide polymer, where the epoxy groups are ring-opened via reaction with a polyamine, thereby providing terminal amino groups that may be rendered cationic, and secondary hydroxyl groups.

Cationic salt groups can be formed by solubilizing the resin with an inorganic or organic acid such as those conventionally used in electrodepositable compositions. Suitable examples of solubilizing acids include, but are not limited to, sulfamic, acetic, lactic, alkanesulfonic such as methanesulfonic, and formic acids.

In embodiments of the present invention where a film-forming polymer is present, the reaction product may be present in the composition in an amount ranging from 10 to 90 weight percent, based on the total weight of resin solids present in the composition. Likewise, the film-forming polymer may be present in an amount ranging from 10 to 90 weight percent, based on the total weight of resin solids present in the composition.

The compositions of the present invention, when used as an electrodeposition bath, can have a total resin solids content within the range of 5 to 25 percent by weight based on total weight of the electrodeposition bath.

Besides water, the aqueous medium of an electrodeposition bath may contain a coalescing solvent. Useful coalescing solvents include hydrocarbons, alcohols, esters, ethers and ketones. The most common coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. Mixtures of solvents may be used.

The composition of the present invention may further contain a variety of additives including coalescing solvents, pigments, thixotropes, plasticizers, extenders, stabilizers, and antioxidants, as are commonly used in the art.

A pigment composition and other optional additives such as surfactants, wetting agents or catalyst can be included in an electrodeposition bath. The pigment composition may be of the conventional type comprising, for example, inorganic pigments such as iron oxides, china clay, carbon black, coal dust, titanium dioxide, talc, barium sulfate, as well as organic color pigments such as phthalocyanine green and the like.

The compositions of the present invention can be applied to a wide variety of substrates by conventional means including brushing, dipping, flow coating, spraying and the like, and as previously mentioned, electrodeposition.

When the composition of the present invention is electrodepositable, the composition can be electrophoretically deposited onto at least a portion of any of a variety of electroconductive substrates, including but not limited to various metallic substrates. Suitable metallic substrates can include ferrous metals and non-ferrous metals as well as alloys, all of which are well known in the art.

The compositions of the present invention can be applied to either bare metal or pretreated metal substrates. By "bare metal" is meant a virgin metal substrate that has not been treated with a pretreatment composition such as conventional phosphating solutions, heavy metal rinses and the like. Additionally, for purposes of the present invention, 'bare metal' substrates can include a cut edge of a substrate that is otherwise treated and/or coated over the non-edge surfaces of the substrate.

Before any treatment or application of any coating composition, the substrate optionally may be formed into an object of manufacture. A combination of more than one metal substrate can be assembled together to form such an object of manufacture.

Also, it should be understood that as used herein, an electrodepositable composition or coating formed "over" at least a portion of a "substrate" refers to a composition formed directly on at least a portion of the substrate surface, as well as a composition or coating formed over any coating or pretreatment material which was previously applied to at least a portion of the substrate. That is, the "substrate" upon which the coating composition is applied can comprise, for example any electroconductive substrates including those described above to which one or more pretreatment and/or primer coatings have been previously applied.

A typical electrodeposition process involves immersing the electroconductive substrate into an electrodeposition bath of an aqueous electrodepositable composition, the substrate serving as a cathode in an electrical circuit comprising the cathode and an anode. Sufficient electrical current is applied between the electrodes to deposit a substantially continuous, adherent film of the electrodepositable coating composition onto at least a portion of the surface of the electroconductive substrate.

EXAMPLES

Example A-1 describes the preparation of a reaction product of a polyamine and an acyclic carbonate in accordance with the present invention. Examples A-2 and B demonstrate the preparation of aqueous reaction products of the present invention using epoxy-acrylic graft copolymers. Example A-3 is a comparative example, demonstrating the preparation of an aqueous reaction product using graft copolymers and a reaction product of a polyamine and a cyclic carbonate.

Example A-1

A reaction product of a polyamine and an acyclic carbonate was prepared as described below:

| | Compound | Weight (grams) |
|---|---|---|
| 1 | Dipropylenetriamine | 1494 |
| 2 | Dimethyl Carbonate | 2256 |
| 3 | Propylene Carbonate | (1/1 mole based on remaining $NH_2$) |

Charge 1 was charged to a round bottom flask. Charge 2 was added dropwise over 3 hours, maintaining temperature below 40° C. The mixture was held at ambient temperature until the titrated meq amine value fell below 3.643 meq/g (approximately 5 days; greater than 90% conversion of primary amine). The mixture was vacuum stripped at 35° C.

until the methanol level fell to less than 0.2% as measured by gas chromatography. The remaining amine (meq) was measured and the value used to calculate the remaining primary amine by subtracting the theoretical amount of secondary amine. Charge 3 was added for an equivalent mole amount to the calculated remaining primary amine (144 grams in this example) while the mixture was allowed to exotherm to no more than 45° C. The mixture was held at less than 35° C. for 16 hours.

Example A-2

| | | Weight (/g) |
|---|---|---|
| A | EPON 828[1] | 305.73 |
| | BISPHENOL A | 132.03 |
| | Methyl isobutylketone | 72.36 |
| B | Ethyl triphenylphosphonium iodide | 2.99 |
| C | Methyl isobutylketone | 55.03 |
| D | Ethyl acrylate | 177.29 |
| | Styrene | 15.32 |
| | Hydroxypropyl methacrylate | 43.78 |
| | Methyl methacrylate | 135.71 |
| | Glycidyl methacrylate | 65.66 |
| | t-dodecylmercaptan | 17.51 |
| | t-butyl perbenzoate | 21.89 |
| | Methyl isobutylketone | 21.89 |
| E | LUPERSOL 75M[2] | 8.76 |
| F | Reaction product of Example A-1 | 145.81 |
| | DOWANOL PM[3] | 83.60 |
| G | diethanolamine | 38.55 |
| H | Sulfamic acid | 37.70 |
| | Deionized water | 2752.80 |

[1] a polyglycidyl ether of Bisphenol A available from Resolution Performance Products.
[2] t-butyl peroxyacetate, available from Arkema Inc.
[3] Propylene glycol methyl ether, available from Dow Chemical Co.

Components A and B were charged to a flask equipped with a nitrogen inlet, stirrer, condenser and thermocouple. The temperature was increased until reflux started and the temperature was adjusted to maintain reflux throughout the remainder of the reaction.

After one hour at reflux, C was added and then the components of D were added at a uniform rate over 150 minutes. The reaction was continued for a further 30 minutes and then E was added over a period of 10 minutes. 90 minutes later, components F were added then, 60 minutes later, G was added. After a further 90 minutes, 1209.5 g of the reaction mixture were poured into components H at 50 C while stirring rapidly. MIBK and water were removed by distillation under reduced pressure. The final dispersion had a solids content of 32.65% and an Mz of 140,000 (measured by GPC in DMF).

Example A-3 (Comparative)

| | | Weight (/g) |
|---|---|---|
| A | Epon 828 | 276.51 |
| | Bisphenol A | 119.41 |
| | Methyl isobutylketone | 65.45 |
| B | Ethyl triphenylphosphonium iodide | 2.70 |
| C | Methyl isobutylketone | 49.77 |
| D | Ethyl acrylate | 160.35 |
| | Styrene | 13.86 |
| | Hydroxypropyl methacrylate | 39.59 |
| | Methyl methacrylate | 122.74 |
| | Glycidyl methacrylate | 59.39 |
| | t-dodecylmercaptan | 15.84 |
| | t-butyl perbenzoate | 19.80 |
| | Methyl isobutylketone | 19.80 |
| E | LUPERSOL 75M | 7.92 |

-continued

| | | Weight (/g) |
|---|---|---|
| F | Reaction product of diethylene triamine and propylene carbonate in a molar ratio of 1:2.1 (60% in DOWANOL PM) | 255.0 |
| G | diethanolamine | 34.86 |
| H | Sulfamic acid | 29.01 |
| | Deionized water | 2534.32 |

Components A and B were charged to a flask equipped with a nitrogen inlet, stirrer, condenser and thermocouple. The temperature was increased until reflux started and the temperature was adjusted to maintain reflux throughout the remainder of the reaction. After one hour at reflux, C was added and then components D were added at a uniform rate over 150 minutes. The reaction was continued for a further 30 minutes and then E was added over a period of 10 minutes. 90 minutes later, components F were added then, 60 minutes later, G was added. After a further 90 minutes, 1136.7 g of the reaction mixture were poured into components H at 50 C whilst stirring rapidly.

MiBK and water were removed by distillation under reduced pressure. The final dispersion had a solids content of 24.61% and an Mz of 139 000 (measured by GPC in DMF).

Example B

| | | Weight (/g) |
|---|---|---|
| A | EPON 828 | 311.68 |
| | BISPHENOL A | 134.60 |
| | Methyl isobutylketone | 73.77 |
| B | Ethyl triphenylphosphonium iodide | 3.04 |
| C | Methyl isobutylketone | 47.53 |
| D | Ethyl acrylate | 180.74 |
| | Styrene | 15.62 |
| | Hydroxypropyl methacrylate | 44.63 |
| | Methyl methacrylate | 136.11 |
| | Glycidyl methacrylate | 66.94 |
| | Acrylic acid | 2.23 |
| | VAZO 67[1] | 26.78 |
| | Methyl isobutylketone | 22.31 |
| E | LUPERSOL 75M | 8.93 |
| F | Reaction product of Example A-1 | 147.54 |
| | DOWANOL PM | 84.89 |
| G | diethanolamine | 38.00 |
| H | Sulfamic acid | 37.16 |
| | Deionized water | 2752.31 |

[1] 2,2'-Azobis(2-methylbutanenitrile), commercially available from E. I. Du Pont de Nemours and company.

Components A and B were charged to a flask equipped with a nitrogen inlet, stirrer, condenser and thermocouple. The temperature was increased until reflux started and the temperature was adjusted to maintain reflux throughout the remainder of the reaction.

After one hour at reflux, C was added and then the components of D were added at a uniform rate over 150 minutes. The reaction was continued for a further 30 minutes and then E was added over a period of 10 minutes.

90 minutes later, components F were added then, 60 minutes later, G was added.

After a further 90 minutes, 1210.5 g of the reaction mixture were poured into components H at 50 C while stirring rapidly.

MIBK and water were removed by distillation under reduced pressure. The final dispersion had a solids content of 31.80% and an Mz of 82,000 (measured by GPC in DMF).

Examples C-2, D-2, and E-2 demonstrate the preparation of polyepoxides containing terminal ethylenically unsaturated groups, prepared by reacting ethyltriphenylphosphonium iodide with a polyglycidyl ether of a polyhydric alcohol or phenol.

Samples of the compositions of Examples A-2, A-3, and B were placed in sealed glass containers and stored at 120° F. (48.9° C.). Periodically, the base content of the dispersions were determined by titration. Titration results are presented in the following Table A.

TABLE A

| Example | Base content (milliequivalents on solids) | | | |
|---|---|---|---|---|
| | Initial | 1 week | 2 weeks | 4 weeks |
| A-2 | 0.821 | 0.824 | 0.821 | 0.824 |
| B | 0.799 | 0.792 | 0.799 | 0.796 |
| A-3 (Comparative) | 0.809 | 0.821 | 0.833 | 0.857 |

The data in Table A above demonstrates that the reaction product of Comparative Example A-3, prepared using a cyclic carbonate, undergoes decomposition over time in elevated temperature conditions, generating bases, whereas reaction products of the present invention remain stable.

Example C-1

An amine-urethane reaction product was prepared as follows:

| Ingredient | Weight |
|---|---|
| Bishexamethylene triamine (b-HMTA) | 520.8 |
| Dimethyl carbonate (DMC) | 479.2 |

Bishexamethylene triamine was charged to a 3L flask under nitrogen and heated to 80° C. To this was added dimethyl carbonate, dropwise, keeping the temperature below 85° C. After the addition the reaction mixture was maintained at 80° C. for an meq amine value of ~3.3. Methanol and excess dimethyl carbonate then was removed by vacuum stripping. The resultant solid material was recrystalized from methyl isobutyl ketone (MIBK) to give crystals with a melting point of 84-85° C. NMR analysis indicated the product to be dimethyl carbamate of hexamethylene triamine.

| Charge | Compound | Weight |
|---|---|---|
| 1 | Epon 828 | 88.26 |
| | Bisphenol A | 38.11 |
| | Polyol[1] | 17.95 |
| | MIBK | 5.93 |
| 2 | Ethyltriphenyl-phosphonium iodide | 0.09 |
| 3 | MIBK | 8.33 |
| 4 | Amine Urethane of Example C-1 | 35.24 |
| 5 | Diketimine[2] | 4.31 |
| 6 | EPON 828 | 1.78 |

[1] 6:1 ethoxylated Bisphenol A diol available from BASF Surfactants as Macol 98B.
[2] Reaction product of diethylenetriamine and methylisobutyl ketone (73% solids in MIBK)

Charges 1 and 2 were added to a 500 ml flask under nitrogen and heated to 125° C. and held for 1 hour. The reaction mixture then was heated to 135° C. over 15 minutes held at 135° C. for one hour more. Charge 3 was then added. At 110° C. reaction temperature, Charge 4 was added and the reaction mixture held at 120° C. for 1 hour. Charge 5 then was added and the mixture was held at 120° C. for one hour 30 minutes more. EPON 828 (Charge 6) then was added and mixture was maintained at 120° C. for 30 minutes. The reaction mixture then was thinned with Dowanol PM.

Example D-1

An amine-urethane reaction product was prepared as follows:

| Ingredient | Weight |
|---|---|
| Diethylene triamine (DETA) | 342.37 |
| Dimethyl carbonate (DMC) | 657.63 |

Diethylene triamine was charged to a 3L flask under nitrogen and heated to 35° C. to this was added dimethyl carbonate, dropwise, keeping the temperature below 40° C. After the addition the reaction mixture was maintained at 35° C. for an meq amine value of ~3.7. Methanol and excess dimethyl carbonate then was removed by vacuum stripping. The resultant solid material was recrystalized from methyl isobutyl ketone to give crystals with a melting point of 81-82° C. NMR analysis indicated the product to be dimethyl carbarmate of diethylene triamine.

Example D-2

| Charge | Compound | Weight |
|---|---|---|
| 1 | Epon 828 | 94.31 |
| | Bisphenol A | 40.72 |
| | Polyol (Macol 98B) | 19.18 |
| | MIBK | 6.33 |
| 2 | Ethyltriphenyl-phosphonium iodide | 0.09 |
| 3 | MIBK | 8.90 |
| 4 | Amine Urethane of Example D-1 | 24.08 |
| 5 | Diketimine | 4.60 |
| 6 | EPON 828 | 1.78 |

Charges 1 and 2 were added to a 500 ml flask under nitrogen and heated to 125° C. and held for 1 hour. The reaction mixture then was heated to 135° C. over 15 minutes and held at 135° C. for one hour more. Charge 3 was then was added. At a reaction temperature of 110° C., Charge 4 was added and the reaction mixture held at 122° C. for 1 hour. Charge 5 then was added and the reaction mixture was held at 122° C. for one hour 30 minutes more. Charge 6 was then added and the mixture was maintained at 125° C. for 30 minutes. The reaction mixture then was thinned with Dowanol PM.

Example E-1

An amine-urethane was prepared as follows:

| Ingredient | Weight |
| --- | --- |
| Bishexamethylene triamine | 4166.37 |
| Dimethyl carbonate | 3833.63 |
| Propylene carbonate | 785.9 |

Bishexamethylene triamine was charged to a 12L flask with nitrogen blanket and heated to 55° C. To this was added dimethyl carbonate drop wise keeping the temperature below 60° C. The reaction mixture then was held at 55° C. for an MEQ amine value of 3.4. Propylene carbonate then was added drop wise keeping the temperature below 60° C. The reaction mixture then was held at 55° C. for several hours for an MEQ amine value of 2.2. Methanol then was removed by vacuum stripping at 70° C. The final solids of the reaction product was 97.7% with an MEQ amine value of 2.66.

Example E-2

| Charge | Compound | weight |
| --- | --- | --- |
| 1 | Epon 828 | 86.69 |
|   | Bisphenol A | 37.44 |
|   | Polyol (Macol 98B) | 17.63 |
|   | MIBK | 5.82 |
| 2 | Ethyltriphenyl-phosphonium iodide | 0.08 |
| 3 | MIBK | 8.18 |
| 4 | Amine Urethane of Example E-1 | 38.14 |
| 5 | Diketimine | 4.23 |
| 6 | EPON 828 | 1.78 |

Charges 1 and 2 were added to a 500 ml flask under nitrogen and headed to 125° C. and held for 1 hour. The reaction mixture then was heated to 135° C. over 15 minutes and held at 135° C. for one hour more. Charge 3 was then added. At a reaction temperature of 110° C., Charge 4 was added and the reaction mixture held at 122° C. for 1 hour. Charge 5 then was added and the reaction mixture was held at 122° C. for one hour 30 minutes more. Charge 6 was then added and reaction was maintained at 125° C. for 30 minutes. The reaction mixture then was thinned with Dowanol PM.

Example F demonstrates the preparation of a curable film-forming composition in accordance with the present invention.

Example F

| Charge | Compound | weight | SOLID weight |
| --- | --- | --- | --- |
| 4 | Diethylene triamine | 206.0 | 206.0 |
| 2 | Dimethyl carbonate | 396.0 | 259.8 |
| 3 | EPON 880[1] | 376.0 | 376.0 |
| 4 | MIBK | 148.5 | 0 |

[1]Polyglycidyl ether of Bisphenol A available from Resolution Performance Products.

Charge 1 and Charge 2 were added sequentially to a suitable reactor and the mixture allowed to exotherm to no more than 50° C. The mixture was then held at 45 to 50° C. for eight hours. Charge 3 was added and the mixture heated to 125° C. Solvent was distilled off and the mixture was held at 125° C. until the epoxy equivalent weight was at least 10,000. Charge 4 was added slowly. The resulting polymer had an amine equivalent weight of 2.376 and a theoretical solids content of 85 percent by weight.

Example G-1

A crosslinking agent for use in Comparative Example G-2 was prepared as follows:

|   | Ingredient | Weight |
| --- | --- | --- |
| 1 | BUTYL CELLOSOLVE | 1855.91 |
| 2 | Propylene Glycol | 1195.08 |
| 3 | Dibutyltin Dilaurate | 2.07 |
| 4 | MIBK | 485.80 |
| 5 | PAPI 2940[1] | 4145.87 |
| 6 | MIBK | 314.08 |

[1]Available from Dow Chemical Co.

Ingredients 1, 2, 3, and 4, were charged to a suitable reactor and heated to 40° C. under nitrogen. Charge 5 was added and the temperature of the mixture kept under 130° C. Charge 6 was added as a rinse through the container of charge 5, and the mixture held at 120-130° C. until no isocyanate was detected by IR.

Example G-2 (Comparative)

| Charge | Compound | weight |
| --- | --- | --- |
| 1 | Epon 880 | 682.30 |
|   | Bisphenol A | 197.80 |
|   | Polyol[1] | 238.78 |
|   | MIBK | 58.89 |
| 2 | Benzyldimethyl-amine (BDMA) | 0.99 |
| 3 | BDMA | 2.08 |
| 4 | Crosslinker of Example G-1 | 1184.16 |
|   | Diketimine | 76.56 |
|   | N-methyl ethanolamine | 65.28 |
| 5 | Epon 880 | 17.80 |
|   | MIBK | 4.06 |

[1]Low-ion version of Macol 98B, available from BASF Surfactants as Macol 98A Mod 1

Charge 1 was added to a suitable reactor and heated to 100° C. Charge 2 was added and the mixture allowed to exotherm to between 140 and 150° C. The temperature was held at 140° C. for 40 minutes. Charge 3 was added and the mixture containuted to be held at 140° C. until the epoxy equivalent weight was 1080. Charge 4 was added and the mixture allowed to exotherm to 110 to 120° C. After the addition of Charge 4, the mixture was held at 110° C. for 45 minutes. Charge 5 was added and the mixture held for one hour at 110° C. the resulting polymer was diluted to 50 percent solids in MIBK.

Examples 1 to 7

Examples 1 to 7 demonstrate the preparation of curable film-forming compositions according to the present invention. Solutions of the resins were first prepared, then films were cast over C700/DI HIA metal substrate (available from ACT Laboratories, Inc., 273 Industrial Dr., Hillsdale, Mich., 49242), using a RDS75 wire wound drawdown bar (available from RD Specialties, 560 Salt Rd., Webster, NY 14580). The films were ambient flashed for 10 minutes, then baked at various temperatures (300° F./148.9° C., 320° F./160° C., 340° F./171.1° C., 360° F./182.2° C.). Cure was determined by the films' resistance to 100 double acetone rubs, as shown in Table III. The ingredients were blended together in parts by weight as shown in the following Tables I and II.

TABLE I

| Example 1 | Example C | DOWANOL PM | Butyl CELLOSOLVE | Butyl CARBITOL formal | Dibutyltin-dilaurate | % solids |
|---|---|---|---|---|---|---|
| | 182.9 | 30.5 | 109.1 | 3.9 | 4.7 | 40.1 |
| Example 2 | Example D | DOWANOL PM | Butyl CELLOSOLVE | Butyl CARBITOL formal | Dibutyltin-dilaurate | % solids |
| | 182.5 | 30.4 | 109 | 3.9 | 4.6 | 40.1 |
| Example 3 | Example E | DOWANOL PM | Butyl CELLOSOLVE | Butyl CARBITOL formal | Dibutyltin-dilaurate | % solids |
| | 169.4 | 28.2 | 101 | 3.6 | 4.4 | 40.6 |
| Example 4 | Example F | MIBK | Butyl CELLOSOLVE | Butyl CARBITOL formal | Dibutyltin-dilaurate | % solids |
| | 159.1 | 67.7 | 77.3 | 4.2 | 5.0 | 45.0 |
| Example 5 (Comparative) | Example G | | Butyl CELLOSOLVE | Butyl CARBITOL formal | Dibutyltin-dilaurate | % solids |
| | 219.4 | | 24.8 | 3.4 | 4.1 | 45.2 |

TABLE II

| Example 6 | Example 1 | JONCRYL 500* | Butyl CELLOSOLVE |
|---|---|---|---|
| | 20 | 2.5 | 3 |
| Example 7 | Example 4 | JONCRYL* 500 | Butyl CELLOSOLVE |
| | 17.8 | 2.5 | 3 |

*Joncryl 500 is an acrylic polymer available from Johnson Polymer, 8310 16th Street, Sturtevant, WI, 53177.

TABLE III

| | 30'/300° F. | 30'/320° F. | 30'/340° F. | 30'/360° F. |
|---|---|---|---|---|
| Example 1 | no effect | no effect | | |
| Example 2 | | fail to metal @ 50 rubs | no effect | |
| Example 3 | | lightly scratched | no effect | |
| Example 4 | | fail to metal @ 15 rubs | heavily marred | no effect |
| Example 5 (Comparative) | fail to metal @ 85 rubs | no effect | | |
| Example 6 | | | scratched | lightly scratched |
| Example 7 | | | fail to metal @ 15 rubs | no effect |

Whereas particular embodiments of this invention have been described above for purposes of illustration, it will be evident to those skilled in the art that numerous variations of the details of the present invention may be made without departing from the invention as defined in the appended claims.

Therefore, we claim:

1. A film-forming composition comprising a reaction product of:
   a) a polyamine containing a primary amino group and a secondary amino group; and
   b) an acyclic carbonate.

2. The composition of claim 1, wherein the polyamine contains at least two primary amino groups.

3. The composition of claim 1, wherein the polyamine comprises diethylenetriamine, dipropylenetriamine, and/or bis-hexamethylenetriamine.

4. The composition of claim 1, wherein the acyclic carbonate comprises dimethyl carbonate, diethyl carbonate, methylethyl carbonate, dipropyl carbonate, methylpropyl carbonate, and/or dibutyl carbonate.

5. The composition of claim 1, wherein the film-forming composition comprises an electrodepositable composition.

6. The composition of claim 1, further comprising a film-forming polymer.

7. The composition of claim 6, wherein the polymer comprises an epoxy functional acrylic polymer and/or a polyglycidyl ether of polyphenol or polyhydric alcohol.

8. The composition of claim 7, wherein the polymer comprises an epoxy functional acrylic polymer, wherein the epoxy functional acrylic polymer comprises acrylic polymers derived from ethylenically unsaturated epoxy functional monomers, and/or graft copolymers of acrylic polymers and polyepoxides.

9. The composition of claim 8, wherein the polymer comprises an epoxy functional acrylic polymer comprising graft copolymers of acrylic polymers and polyepoxides, wherein the polyepoxides used to prepare the graft copolymer are prepared by reacting ethyltriphenylphosphonium iodide with a polyglycidyl ether of a polyhydric alcohol or phenol.

10. The composition of claim 6, wherein the composition comprises an electrodepositable composition.

11. The composition of claim 10, wherein the film-forming polymer comprises anionic groups, or cationic groups comprising quaternary phosphonium groups, quaternary ammonium groups, ternary sulfonium groups and/or cationic amine salt groups wherein the amine salt groups are derived from a compound comprising ammonia, methylamine, methylethanolamine, dibutylamine, aminopropyldiethanolamine, dimethylaminopropylamine, diethanolamine, diisopropanolamine, N-hydroxyethyl ethylenediamine, and/or diethylenetriamine.

12. A film-forming composition comprising a reaction product of:
   1) a first reactant comprising a reaction product of:
      a) a polyamine containing a primary amino group and a secondary amino group; and
      b) an acyclic carbonate; and
   2) a second reactant comprising a polyepoxide polymer.

13. The composition of claim 12, wherein the polyepoxide polymer comprises an epoxy functional acrylic polymer comprising graft copolymers of acrylic polymers and polyepoxides, wherein the polyepoxides used to prepare the graft copolymer are prepared by reacting ethyltriphenylphosphonium iodide with a polyglycidyl ether of a polyhydric alcohol or phenol.

14. The composition of claim 12, wherein the film-forming composition comprises an electrodepositable composition.

15. The composition of claim 12, further comprising a film-forming polymer.

16. The composition of claim 15, wherein the film-forming composition comprises an electrodepositable composition.

17. A method of preparing a film-forming composition comprising:
   1) combining the following components to form a reaction mixture:
      a) a polyamine containing a primary amino group and a secondary amino group; and
      b) an acyclic carbonate; and
   2) allowing the components to react to form a first reaction product.

18. The method of claim 17 wherein the reaction mixture is essentially free of catalysts.

19. A coated article comprising a metal substrate at least partially coated with the curable film-forming composition of claim 1.

* * * * *